United States Patent Office 3,536,996
Patented Oct. 27, 1970

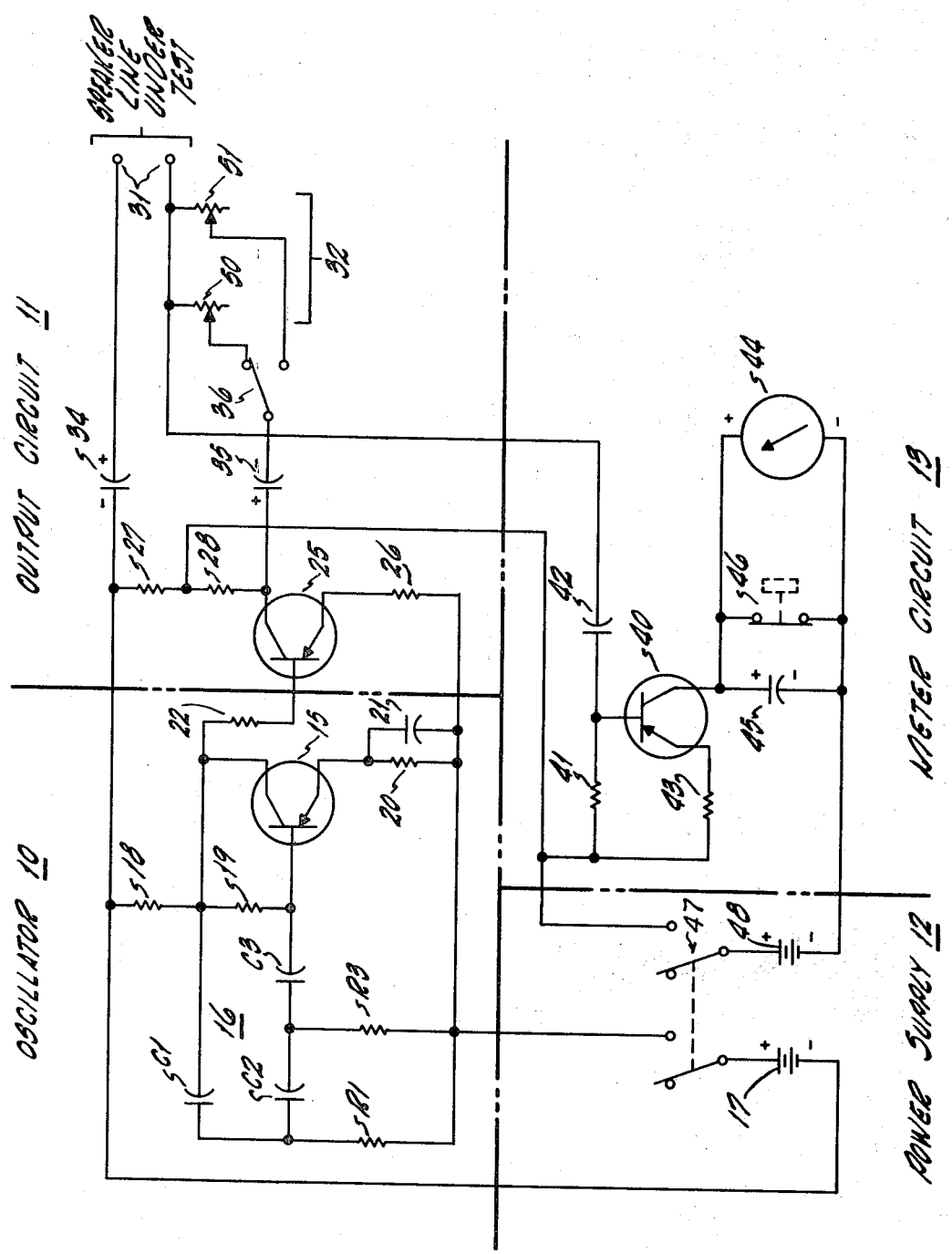

3,536,996
BRIDGE CIRCUIT FOR MEASURING AUDIO LINE IMPEDANCE
Bruce Ronald Saxon, Harrisburg, Pa., and Richard A. Thompson, Palos Verdes Peninsula, Calif., assignors to International Telephone and Telegraph Corporation, New York, N.Y., a corporation of Delaware
Filed Oct. 28, 1968, Ser. No. 770,985
Int. Cl. G01r 1/30, 27/00
U.S. Cl. 324—57                                 5 Claims

ABSTRACT OF THE DISCLOSURE

The invention provides a resistive bridge coupled between an audio line, a meter, and an oscillator for dynamically measuring line impedance. The line forms one arm of the bridge. The meter is coupled across a horizontal diagonal of the bridge, and the oscillator is coupled across a vertical diagonal. While the tone is being sent over the line, an adjustable arm of the bridge is varied until the meter shows a null. The adjusting knob is calibrated to directly indicate the value of the unknown impedance.

---

This invention relates to a small portable means for ascertaining an A.C. impedance and more particularly to bridge means for measuring the dynamic impedance of an audio line in a public address system.

Very often, it is necessary to ascertain the value of an unknown A.C. impedance. For example, a number of loudspeakers may be located at various places served by a single amplifier in a public address system. The impedance of some speakers may be at the high extreme, and the impedance of other speakers may be at the low extreme of allowable impedance tolerances. Some speakers may be at the ends of long wires, and other speakers may be at the ends of short wires. These and many other random installation variables produce effects upon the speaker impedance, as seen from an associated amplifier.

If the public address system is to function well, it is necessary for all speakers to present substantially the same impedance to the associated amplifiers. Thus, it is necessary to measure the impedance of each line and to build a matching network which complements the actual impedance of the line to provide a standard impedance. Heretofore, the technique for measuring the line impedance has been a rather complex one, involving many procedures and requiring technical knowledge by the person measuring the impedances. Also, the prior art devices were not easily usable in the field.

When attempts were made to develop small, low cost meters to measure the dynamic impedance of the line, the results have tended to be a little less than satisfactory. First, the meters have generally measured D.C. impedances which may or may not be an accurate reflection of the A.C. impedances. Second, the meters have been expensive and complicated.

Accordingly, an object of the invention is to provide new and improved dynamic A.C. impedance meters. More particularly, an object is to provide simple meters for measuring the A.C. impedance of an audio line having loudspeakers attached thereto. Here an object is to provide a meter which facilitates the installation of public address systems.

These and other objects of the invention are accomplished by means of an audio line tester—in the form of a small pocket meter—which measures the impedance of line leading to and including a loudspeaker or a group of loud speakers. The tester includes an A.C. oscillator coupled to a resistive bridge, one arm of which is the audio line having the unknown impedance. An impedance measurement is achieved by energizing the line by a tone sent over a circuit from an oscillator through the bridge to the line while a person using the meter varies a calibrated control until a microammeter indicates a null balance within the bridge. Two calibrated controls are used to span the impedance ranges of 4 ohm to 300 ohm and 300 ohm to 2500 ohm.

The above mentioned and other features and objects of this invention and the manner of obtaining them will become more apparent, and the invention itself will be best understood by reference to the following description of an embodiment of the invention taken in conjunction with the single sheet of drawings which shows a schematic circuit diagram of an A.C. impedance meter constructed in accordance with the invention.

Dot-dashed lines divide the drawing into four basic parts which are an oscillator 10, an output circuit 11, a power supply 12, and a meter circuit 13. The oscillator comprises a PNP transistor used in a common emitter configuration. An RC phase shift circuit 16, coupled between the base and collector, sets the frequency of oscillation. Base bias is supplied to transistor 15 via a circuit which may be traced from the negative side of a battery 17 through resistors 18, 19 to the base electrode. The resistor 18 also functions as a load for the transistor 15. The emitter bias is supplied from the positive terminal of the battery 17 through an "on" and "off" switch to the resistor 20, which is by-passed by a capacitor 21 in order to reduce input impedance. A resistor 22 provides a direct interstage coupling.

The output circuit 11 includes a second PNP transistor 25 used in a common emitter configuration to provide amplification. The oscillator tone is applied to the base of the transistor 25 through the interstage coupling resistor 22. The emitter of the transistor 25 is biased from the positive terminal of the battery 17 via the "on" and "off" switch, and a resistor 26, which also provides a negative feed back for stabilization. The collector of the transistor 25 is connected to the negative terminal of the battery 17 via resistors 27, 28 which form two arms of a bridge circuit. The upper and lower ends of these two resistors are coupled via capacitors 34, 35 to the remaining two arms 31, 32 of the bridge. The arm 31 is the line under test having the unknown impedance which is to be measured, and the arm 32 is a variable resistor which may be adjusted, by moving a switch 36, to select a range of meter readings. For convenience, the points 31 may be made in the form of test leads having banana plugs on one end and a Mini-Gator clip on the other end.

The meter circuit comprises a class B amplifier in the form of a PNP transistor 40 coupled in an common emitter configuration and used as an output amplifier. The base bias and input signal are applied to the transistor 40 via a resistor 41 coupled across the horizontal diagonal of the bridge. That is, one end of the resistor 41 is coupled to the midpoint between the resistors 27, 28 and the other end of the resistor 41 is coupled to the midpoint between the unknown line impedance 31 and the variable bridge resistor 32. The coupling capacitor 42 prevents any D.C. of the bias circuit from reaching the bridge circuit. Emitter bias and a stabilizing degeneration feed back is supplied via the resistor 43. A microammeter 44 is coupled to the collector and in parallel with a smoothing capacitor 45 and a nonlocking pushbutton 46. The pushbutton 46 removes a shunt from around the meter in order to provide an output reading. This shunt is provided to protect the meter against rough handling and power surges.

It is important to note that there are two entirely separate batteries 17 and 48 for energizing the circuit and the meter, respectively. Except for a common ground point at the connection between resistors 27, 28 these two batteries are completely isolated from each other with respect to D.C. signals. Hence, there never is any question as to stability, noise, or cross modulation which might otherwise occur when the pushbutton 47 is operated as a result of the oscillator 10 acting through the power supply instead of through the bridge.

The meter operates this way. The oscillator 10 may be designed to generate a tone in the general midscale of the audio range at about 850 cycles per second, for example. The oscillator frequency is also chosen to be within a frequency band where the reactive impedance components are negligible as compared to the resistive component. These components are high enough to avoid an objectional reactive flare cutoff otherwise experienced by most P.A. horn speakers. Oscillations are sustained by a 180° phase shift in a signal fed back from the collector of the transistor 15 through the three RC sections (C1R1, C2R3 and C3R4) to the base of the transistor.

The resulting 850 c.p.s. tone is amplified at 25 and fed into the bridge across a vertical diagonal thereof (i.e., between the upper end of resistor 27 and the lower end of resistor 28). The output from the bridge is taken across a horizontal diagonal (i.e., between the center tap joining resistors 27, 28 and the center tap joining the adjustable resistors 32 and the unknown line impedance 31.) Since the transistor 40 operates in a class B mode, only negative half cycles of the 850 c.p.s. tone reach the meter 44, thus enabling a use of a low cost D.C. meter.

A range is selected by the switch 36, as for example by selecting either a 350 ohm resistor 50 or a 3.5K resistor 51. Then, the pushbutton 46 is operated, and the meter 44 is read while a knob is turned to adjust the selected one of the potentiometers 50 or 51. As the balance of the bridge is brought closer in value, the horizontal diagonal signal decreases because the ratio of the arm impedances (27/28 and $Z_{unknown}/50$ or 51) become equal (bridge in balanced condition). Since the voltage across the horizontal diagonal drives the transistor 40, any balanced condition on bridge network results in a reduced deflection of the microammeter needle. Thus, the meter gives a visual indication of a "null" (bridge balance) condition. A perfect "null" on the bridge does not necessarily show as a zero needle deflection due to a small amount of leakage current present in the transistor; however, the null indicating low point in the meter reading is obvious.

The dials of the balancing potentiometers 50 or 51 may have calibrated markings corresponding to the indicated impedance of the audio circuit connected to the test leads 31.

Hence, it should be obvious that the invention provides a means for determining the dynamic impedance of an audio line while it is being installed. This way all lines may be "tuned" during installation to provide a uniform impedance.

While the principles of the invention have been described above in connection with specific apparatus and applications, it is to be understood that this description is made only by way of example and not as a limitation on the scope of the invention.

We claim:
1. A portable measuring circuit comprising a bridge circuit for measuring audio line impedances,
said bridge circuit comprising four bridge legs,
means in a first of said legs for coupling across a line to be measured,
variable impedance means in the second of said legs for varying the impedance thereof to match the impedance of said line being measured,
said second leg being joined to said first leg,
said impedance varying means comprising a calibrated potentiometer having impedance readings thereon,
a third leg comprising fixed impedance means,
said third leg being contiguous to the said first leg on the side opposite said second leg,
a fourth leg comprising fixed impedance means coupled between said third leg and said second leg to form said bridge circuit,
audio signal source means including an oscillator connected across a first diagonal of said bridge circuit to send audio frequency signals into said bridge circuit,
detector means including a meter connected across a second diagonal of said bridge,
said first diagonal extending between the junctions of said first and third legs and said second and fourth legs,
said second diagonal extending between the junctions of said first and second legs and said third and fourth legs,
said audio frequency source means including a first amplifier,
said detector means including a second amplifier,
said first amplifier connected to amplify the output of said oscillator,
said second amplifier coupled to control the input to said meter,
power supply means comprising first and second separate batteries,
said first battery being connected to provide power to said oscillator,
said second battery being connected to provide power to said first and second amplifiers,
said second battery further being coupled to provide direct current to said meter through said second amplifier,
the amount of current so supplied being a function of the difference in impedance between said line under test and said calibrated impedance means whereby when said two impedances are equal a minimum amount of current flows through said meter.

2. The circuit of claim 1 wherein said oscillator is a phase shift oscillator having feed back circuit consisting of resistor-capacitor elements.

3. The circuit of claim 1 wherein said second amplifier comprises a class B amplifier, and wherein said meter is a direct current ammeter.

4. The circuit of claim 3 and a smoothing capacitor coupled in parallel with said meter to integrate the D.C. pulses out of said class B amplifier.

5. The circuit of claim 1 wherein capacitor means are used to isolate the line circuit under test and said calibrated impedance from said oscillator circuit, and said amplifiers.

References Cited
UNITED STATES PATENTS

| | | | |
|---|---|---|---|
| 2,531,145 | 11/1950 | Marco et al. | 324—62 |
| 2,933,677 | 4/1960 | Lieber. | |
| 3,147,431 | 9/1964 | Bennett et al. | 324—62 |
| 3,257,611 | 6/1966 | McKim | 324—57 |

EDWARD E. KUBASIEWICZ, Primary Examiner

U.S. Cl. X.R.

324—123